United States Patent
Keller

(10) Patent No.: US 9,021,695 B2
(45) Date of Patent: May 5, 2015

(54) METHOD FOR THE PRODUCTION OF A PISTON FOR AN INTERNAL COMBUSTION ENGINE

(71) Applicant: MAHLE International GmbH, Stuttgart (DE)

(72) Inventor: Klaus Keller, Lorch (DE)

(73) Assignee: MAHLE International GmbH, Stuttgart (DE)

(*) Notice: Subject to any disclaimer, the term of this patent is extended or adjusted under 35 U.S.C. 154(b) by 0 days.

(21) Appl. No.: 14/224,368

(22) Filed: Mar. 25, 2014

(65) Prior Publication Data
US 2014/0202001 A1    Jul. 24, 2014

Related U.S. Application Data

(62) Division of application No. 13/516,797, filed as application No. PCT/DE2010/001483 on Dec. 17, 2010, now abandoned.

(30) Foreign Application Priority Data

Dec. 19, 2009 (DE) .......................... 10 2009 059 658

(51) Int. Cl.
    *B23P 15/10*     (2006.01)
    *B21K 1/18*     (2006.01)
    *F02F 3/00*     (2006.01)

(52) U.S. Cl.
    CPC ............ *B23P 15/10* (2013.01); *Y10T 29/49249* (2015.01); *Y10T 29/49252* (2015.01); *Y10T 29/49256* (2015.01); *B21K 1/18* (2013.01); *B21K 1/185* (2013.01); *F02F 3/003* (2013.01); *F02F 3/0092* (2013.01)

(58) Field of Classification Search
CPC .......... B23P 15/10; B21K 1/18; B21K 1/185; F02F 3/003; F02F 3/0092; Y10T 29/49252; Y10T 29/49256; Y10T 29/49249
USPC ............. 29/889.1, 888.04, 888.041, 888.042, 29/888.044, 888.049; 123/193.1; 92/255, 92/260
See application file for complete search history.

(56) References Cited

U.S. PATENT DOCUMENTS 5,065,508 A * 11/1991 Lorento et al. ............. 29/888.42
5,913,960 A    6/1999 Fletcher-Jones
(Continued)

FOREIGN PATENT DOCUMENTS

DE      103 11 149 A1    9/2004
GB          20 311        0/1913
(Continued)

OTHER PUBLICATIONS

International Search Report of PCT/DE2010/001483, Apr. 8, 2011.
(Continued)

*Primary Examiner* — Ryan J Walters
(74) *Attorney, Agent, or Firm* — Collard & Roe, P.C.

(57) ABSTRACT

A method for producing a piston from an upper piston part and a lower piston part. A strip- or plate-shaped semifinished product made of a metal material is provided, from which an annular upper piston part or an annular blank is stamped out, which blank is finished to form an upper piston part, wherein the upper piston part is connected to a lower piston part to form a piston.

9 Claims, 2 Drawing Sheets

(56) References Cited

U.S. PATENT DOCUMENTS

| | | |
|---|---|---|
| 2004/0177505 A1 | 9/2004 | Bing et al. |
| 2008/0245231 A1 | 10/2008 | Gniesmer et al. |
| 2009/0282885 A1* | 11/2009 | Ooka et al. .................... 72/256 |

FOREIGN PATENT DOCUMENTS

| | | |
|---|---|---|
| GB | 848 734 A | 9/1960 |
| GB | 2 225 085 A | 5/1990 |
| JP | S57-137038 A | 8/1982 |
| WO | 2007/031109 A1 | 3/2007 |

OTHER PUBLICATIONS

German Search Report dated Oct. 1, 2010 in German Patent Application No. 10 2009 059 658.5 with English translation of relevant parts.

\* cited by examiner

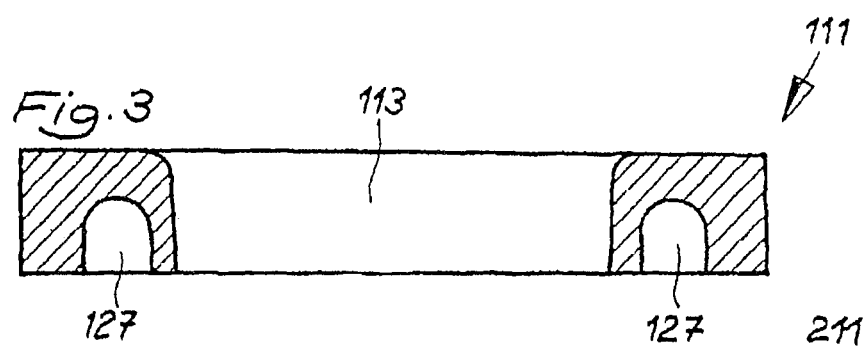
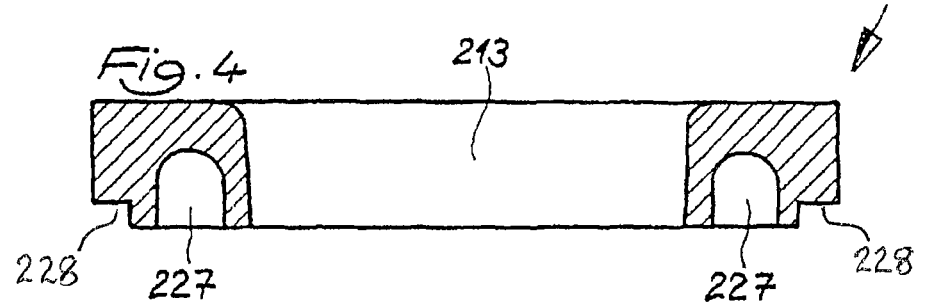

METHOD FOR THE PRODUCTION OF A PISTON FOR AN INTERNAL COMBUSTION ENGINE

CROSS-REFERENCE TO RELATED APPLICATIONS

This is a divisional of U.S. patent application Ser. No. 13/516,797, filed on Sep 12, 2012, which is the National Stage of PCT/DE2010/001483 filed on Dec. 17, 2010 which claims priority under 35 U.S.C. §119 of German Application No. 10 2009 059 658.5 filed on Dec. 19, 2009, the disclosure of which is incorporated by reference. The international application under PCT article 21(2) was not published in English.

BACKGROUND OF THE INVENTION

1. Field of the Invention

The present invention relates to a method for the production of a piston for an internal combustion engine, as well as to a piston that can be produced by means of this method.

2. The Prior Art

DE 103 11 149 A1 discloses a piston composed of an upper piston part and a lower piston part, which are fixed in place by means of a minimal number of weld points and are connected with one another by means of subsequent forging. Such pistons are characterized in that the upper piston part is produced from a particularly temperature-resistant and high-strength material, in order to prevent scaling, particularly in the region of the combustion bowl. However, production of such a piston is complicated and connected with significant costs.

SUMMARY OF THE INVENTION

The task of the present invention consists in making available a method for the production of a piston for an internal combustion engine, which method can be implemented with the least possible effort and reduced costs.

A first solution, according to the invention, consists in that a strip-shaped or plate-shaped semi-finished product made of a metallic material is made available, that a ring-shaped blank is punched out of the semi-finished product and subsequently finished to produce an upper piston part, and that the finished upper piston part is connected to a lower piston part, to produce a piston.

A second solution, according to the invention, consists in that a strip-shaped or plate-shaped semi-finished product made of a metallic material is made available, that at least one surface of the strip-shaped or plate-shaped semi-finished product is finished, that a ring-shaped upper piston part is punched out of the semi-finished product and subsequently connected to a lower piston part, to produce a piston.

A piston that can be produced with this method is furthermore an object of the present invention.

The present invention is characterized in that a particularly simple method for the production of a piston, which method can be implemented with few production steps and is therefore cost-advantageous, is made available. In particular, an upper piston part can be made available, which can be obtained, in particularly simple manner, from any desired material. In this way it is possible, for example, to make available a piston having a particularly high-strength and temperature-resistant upper piston part, in simple and cost-advantageous manner.

Advantageous further developments are evident from the dependent claims.

Preferably, a semi-finished product made from a steel material is used, so that the finished piston meets the requirements during engine operation in optimal manner. In particular, a hot-rolled or cold-rolled steel material is particularly well suited.

For the case that a blank is punched out of the semi-finished product, this blank is preferably machined level along at least one surface, for example by means of lathing or grinding. The level machined surface then forms the piston crown in the finished piston.

For the case that a finished upper piston part is punched out of the semi-finished product, preferably at least one surface of the semi-finished product is machined level before punching. The level machined surface then forms the piston crown in the finished piston. Of course, the upper piston part can be machined as needed after punching.

Depending on the requirements in an individual case, semi-finished products having a thickness of up to 15 mm can be used.

A preferred further development consists in that during punching, a circumferential lower recess is machined into the blank or into the upper piston part, and/or at least one circumferential lateral recess is machined into the blank or the upper piston part, by means of corresponding shaping of the punching tool. In the finished piston, the lower recess forms at least one part of a cooling channel. An outer recess forms part of a ring groove, for example. An inner recess can form part of a combustion bowl, for example.

The finished upper piston part can be connected with a lower piston part, to produce a finished piston, for example by means of soldering or welding. Of course, the piston can also be finished subsequently, as needed.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 3 is another exemplary embodiment of an upper piston part produced according to the method according to the invention, in section;

FIG. 4 is another exemplary embodiment of an upper piston part produced according to the method according to the invention, in section.

DETAILED DESCRIPTION OF THE PREFERRED EMBODIMENT

Figure 1:
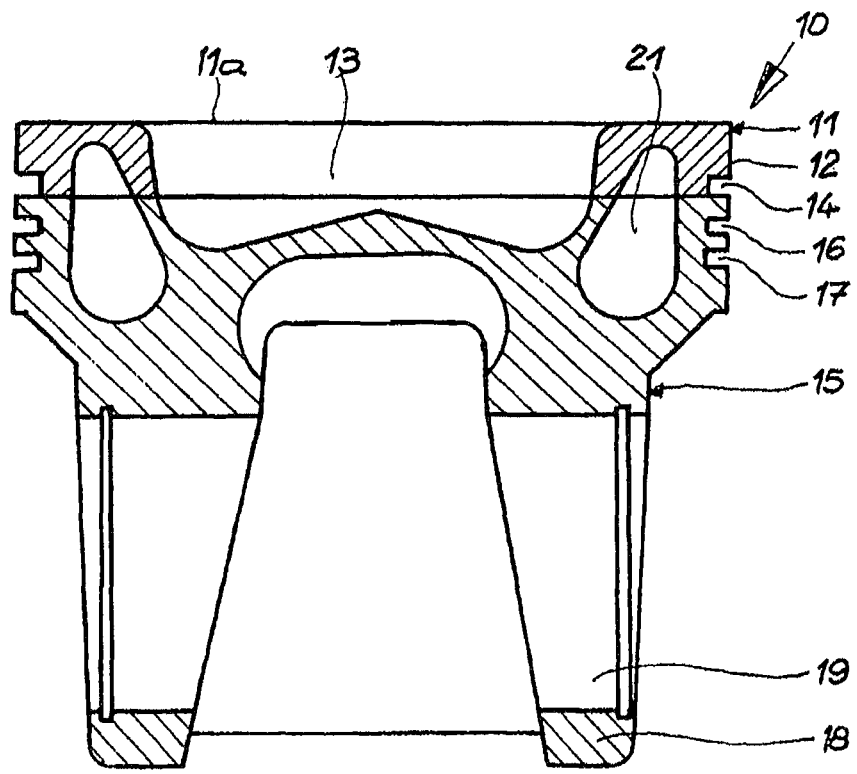
FIG. 1 is an exemplary embodiment of a piston according to the invention, in section.

FIG. 1 shows an exemplary embodiment of a piston 10. Because the invention can be used for all piston types and all piston materials, only one piston type will be used as an example in the following, to describe the present invention.

In the exemplary embodiment, the piston 10 is a two-part welded box piston, the structure of which is known as such. The piston 10 has an upper piston part 11 having a circumferential top land 12. The upper piston part 11 forms a piston crown 11a as well as part of a combustion bowl 13, and has a piston ring groove 14 below the top land 12. The piston 10 furthermore has a lower piston part 15 having two piston ring grooves 16, 17 as well as pin bosses 18 that are set back relative to the piston ring grooves 14, 16, 17. The pin bosses 18 are provided with pin bores 19 for accommodating a piston pin (now shown). The upper piston part 11 and the lower piston part 15 together form a circumferential cooling channel 21.

Figure 2:
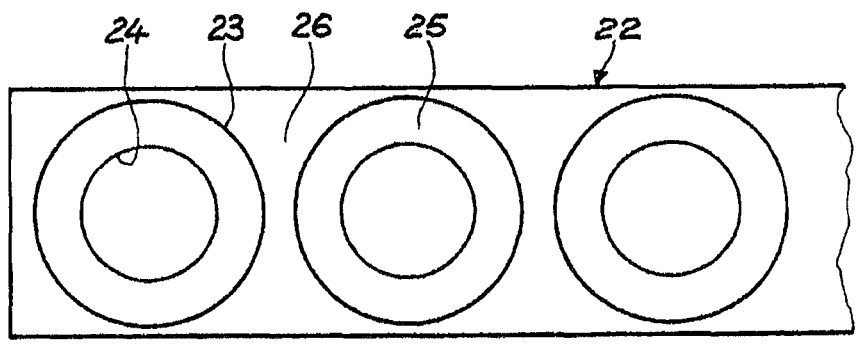
FIG. 2 is a top view of a strip-shaped semi-finished product for use in the method according to the invention.

FIG. 2 shows an exemplary embodiment of a semi-finished product 22, here a strip-shaped semi-finished product, for use in the method according to the invention. The semi-finished product 22 consists, for example, of a hot-rolled or cold-rolled steel material of the type 42CrMo4, having a thickness of 10 mm. The cutting lines along which a ring-shaped blank or a ring-shaped upper piston part is punched out, according to the present invention, are indicated with 23, 24.

For the case that the semi-finished product 22 is used without further processing, a ring-shaped blank 25 is punched out. The blank 25 is machined level along at least one surface, for example by means of grinding or lathing. This surface forms the piston crown 11a of the upper piston part 11 in the finished piston 10. Subsequently, the finished upper piston part 11 is connected to a lower piston part 15, to form a piston 10, for example by means of soldering or welding, such as friction welding, electrode welding, or laser welding. Of course, the piston 10 can also be finished subsequently, as needed.

However, the semi-finished product 22 can be processed further before being punched, in that at least one of its surfaces 26 is machined level, for example by means of grinding or lathing. Subsequently, a ring-shaped upper piston part 11 is punched out. The level machined surface 26 forms forms the piston crown 11a of the upper piston part 11 in the finished piston 10. Subsequently, the finished upper piston part 11 is connected to a lower piston part 15, to form a piston 10, as described above.

FIG. 3 shows an exemplary embodiment of a ring-shaped upper piston part 111 punched out of a semi-finished product 22. The upper piston part 111 has a circumferential lower recess 127 that forms part of a circumferential cooling channel in the finished piston; see the cooling channel 21 in FIG. 1. The recess 127 is formed in that the punching tool is provided with a corresponding embossing shape, in known manner. Therefore the recess 127 is formed at the same time with the punching process. The central opening 113 of the ring-shaped upper piston part 111 forms part of a combustion bowl in the finished piston; see the combustion bowl 13 in FIG. 1. Of course, the same holds true analogously also for production of a blank from the semi-finished product 22.

FIG. 4 shows another exemplary embodiment of a ring-shaped upper piston part 211 punched out of a semi-finished product 22. The upper piston part 211 also has a circumferential lower recess 227 that forms part of a circumferential cooling channel in the finished piston; see the cooling channel 21 in FIG. 1. The upper piston part 211 furthermore has a circumferential outer recess 228 that forms part of a piston ring groove in the finished piston; see the piston ring groove 14 in FIG. 1. The recesses 227 and 228 are formed in that the punching tool is provided with corresponding embossing shapes, in known manner. Therefore the recesses 227 and 228 are formed at the same time with the punching process. The central opening 213 of the ring-shaped upper piston part 211 forms part of a combustion bowl in the finished piston; see the combustion bowl 13 in FIG. 1, Of course, the same holds true analogously also for production of a blank from the semi-finished product 22.

Accordingly, while only a few embodiments of the present invention have been shown and described, it is obvious that many changes and modifications may be made thereunto without departing from the spirit and scope of the invention.

What is claimed is:

1. A method for the production of a piston (10) for an internal combustion engine, comprising the following method steps:
    (a) making available a strip-shaped or plate-shaped semi-finished product (22) made of metallic material,
    (b) punching a ring-shaped blank (25) out of the semi-finished product (22), the step of punching including simultaneously embossing into the blank (25) a central opening (113) and a circumferential lower recess (127, 227) and/or a circumferential lateral recess (228), using a punching tool provided with a corresponding embossing shape,
    (c) finishing the blank (25) to produce an upper piston part (11, 111, 211), and
    (d) connecting the upper piston part (11, 111, 211) to a lower piston part (15), to produce a piston (10).

2. The method according to claim 1, wherein after step (a) and before step (b) at least one surface (26) of the strip-shaped or plate-shaped semi-finished product (22) is finished.

3. The method according to claim 2, wherein at least one surface (26) of the semi-finished product (22) is machined level.

4. The method according to claim 1, wherein said semi-finished product (22) is made from a steel material.

5. The method according to claim 4, wherein said semi-finished product (22) is made from a hot-rolled or cold-rolled steel material.

6. The method according to claim 1, wherein the blank (25) is machined level along at least one surface in step (c).

7. The method according to claim 1, wherein said semi-finished product (22) has a thickness of up to 15 mm.

8. The method according to claim 1, wherein the at least one circumferential lateral recess (228) is formed on the outer or inner circumference of the blank (25).

9. The method according to claim 1, wherein the upper piston part (11, 111, 211) and the lower piston part (15) are connected with one another by welding or soldering.

\* \* \* \* \*